(12) United States Patent
Huang et al.

(10) Patent No.: US 10,693,938 B2
(45) Date of Patent: Jun. 23, 2020

(54) METHOD AND SYSTEM FOR INTERACTIVE TRANSMISSION OF PANORAMIC VIDEO

(71) Applicant: Samsung Electronics Co., Ltd., Gyeonggi-do (KR)

(72) Inventors: Wei Huang, Jiangsu (CN); Jianrong Hu, Jiangsu (CN); Weijun Shi, Jiangsu (CN); Xunmin Chen, Jiangsu (CN); Xinfeng Zhao, Jiangsu (CN); Hao Lin, Jiangsu (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/317,637

(22) PCT Filed: Jul. 12, 2017

(86) PCT No.: PCT/KR2017/007483
§ 371 (c)(1),
(2) Date: Jan. 14, 2019

(87) PCT Pub. No.: WO2018/012888
PCT Pub. Date: Jan. 18, 2018

(65) Prior Publication Data
US 2019/0289055 A1    Sep. 19, 2019

(30) Foreign Application Priority Data

Jul. 12, 2016   (CN) .......................... 2016 1 0547764

(51) Int. Cl.
*H04L 29/06* (2006.01)
*H04N 19/87* (2014.01)
(Continued)

(52) U.S. Cl.
CPC .......... *H04L 65/80* (2013.01); *H04L 65/4092* (2013.01); *H04L 65/602* (2013.01);
(Continued)

(58) Field of Classification Search
CPC ....... H04L 65/80; H04L 65/602; H04L 19/87; H04L 21/23106; H04L 65/4092
(Continued)

(56) References Cited

U.S. PATENT DOCUMENTS

| | | | |
|---|---|---|---|
| 8,264,524 B1 * | 9/2012 | Davey | H04N 5/23206 348/36 |
| 9,245,373 B2 * | 1/2016 | Johnston | G06F 3/011 |

(Continued)

FOREIGN PATENT DOCUMENTS

| | | |
|---|---|---|
| CN | 101002473 | 7/2007 |
| CN | 103096032 | 5/2013 |

(Continued)

OTHER PUBLICATIONS

Aditya Mavlankar et al., "Optimal Server Bandwidth Allocation for Steaming Multiple Streams via P2P Multicast", Oct. 8, 2008, 6 pages.

(Continued)

*Primary Examiner* — Zaihan Jiang
(74) *Attorney, Agent, or Firm* — The Farrell Law Firm, P.C.

(57) ABSTRACT

The present application discloses a method and system for interactive transmission of panoramic video, wherein the method comprises: determining, by a client, the location information of a user's current region of interest; requesting a server for video information of the region of interest by using the location information; and, acquiring, by the server, a panoramic video slice corresponding to the region of interest according to the location information, and transmitting the panoramic video slice to the client. With the present invention, resource overhead and a delay of transmission of panoramic video can be reduced.

16 Claims, 1 Drawing Sheet

(51) Int. Cl.
*H04N 19/423* (2014.01)
*H04N 21/218* (2011.01)
*H04N 21/6587* (2011.01)
*H04N 21/231* (2011.01)
*H04N 21/81* (2011.01)
*H04N 21/2387* (2011.01)
*H04N 21/234* (2011.01)
*H04N 21/4728* (2011.01)
*H04N 21/236* (2011.01)
*H04N 21/433* (2011.01)

(52) U.S. Cl.
CPC ........... *H04N 19/423* (2014.11); *H04N 19/87* (2014.11); *H04N 21/21805* (2013.01); *H04N 21/234* (2013.01); *H04N 21/2387* (2013.01); *H04N 21/23106* (2013.01); *H04N 21/4728* (2013.01); *H04N 21/6587* (2013.01); *H04N 21/816* (2013.01); *H04N 21/236* (2013.01); *H04N 21/4331* (2013.01)

(58) Field of Classification Search
USPC .......................................................... 348/39
See application file for complete search history.

(56) References Cited

U.S. PATENT DOCUMENTS

| | | | |
|---|---|---|---|
| 2002/0021353 A1* | 2/2002 | DeNies | H04N 21/21805 348/36 |
| 2009/0300692 A1* | 12/2009 | Mavlankar | H04N 21/234 725/94 |
| 2012/0299920 A1* | 11/2012 | Coombe | G06T 19/00 345/423 |
| 2013/0070047 A1 | 3/2013 | DiGiovanni et al. | |
| 2013/0141523 A1 | 6/2013 | Banta et al. | |
| 2014/0152655 A1 | 6/2014 | Johnston et al. | |
| 2015/0032901 A1* | 1/2015 | Wang | H04L 65/4092 709/231 |
| 2016/0050349 A1 | 2/2016 | Vance et al. | |
| 2016/0165309 A1 | 6/2016 | Van Brandenburg et al. | |
| 2017/0118540 A1* | 4/2017 | Thomas | H04N 21/2343 |
| 2017/0134740 A1* | 5/2017 | Park | H04N 19/105 |
| 2017/0142486 A1 | 5/2017 | Masuda | |
| 2017/0339391 A1* | 11/2017 | Zhou | H04N 21/21805 |
| 2018/0296190 A1* | 10/2018 | Susumu | G01S 7/52022 |
| 2019/0174161 A1* | 6/2019 | Skupin | H04N 21/4728 |
| 2019/0238861 A1* | 8/2019 | D'Acunto | H04N 21/21805 |
| 2019/0297363 A1* | 9/2019 | Chirokov | H04N 21/21805 |

FOREIGN PATENT DOCUMENTS

| | | |
|---|---|---|
| CN | 103945165 | 7/2014 |
| CN | 104735464 | 6/2015 |
| CN | 105323552 | 2/2016 |
| EP | 1 162 830 | 12/2001 |
| EP | 2824883 | 1/2015 |
| EP | 2 852 149 | 3/2015 |
| JP | 2009194920 | 8/2009 |
| WO | WO 01/95513 | 12/2001 |
| WO | WO 2014/087297 | 6/2014 |
| WO | WO 2015/197815 | 12/2015 |
| WO | WO 2016/009864 | 1/2016 |

OTHER PUBLICATIONS

Aditya Mavlankar et al., "Optimal Slice Size for Streaming Regions of High Resolution Video with Virtual Pan/Tilt/Zoom Functionality", Nov. 1, 2017, 5 pages.

Aditya Mavlankar et al., "Region-of-Interest Prediction for Interactively Streaming Regions of High Resolution Video", Sep. 30, 2017, 10 pages.

Chinese Office Action dated Jan. 23, 2019 issued in counterpart application No. 201610547764.1, 20 pages.

European Search Report dated Feb. 12, 2019 issued in counterpart application No. 17827958.4-1208, 8 pages.

PCT/ISA/210 Search Report issued on PCT/KR2017/007483 (pp. 3).

PCT/ISA/237 Written Opinion issued on PCT/KR2017/007483 (pp. 8).

* cited by examiner

[Fig. 1]
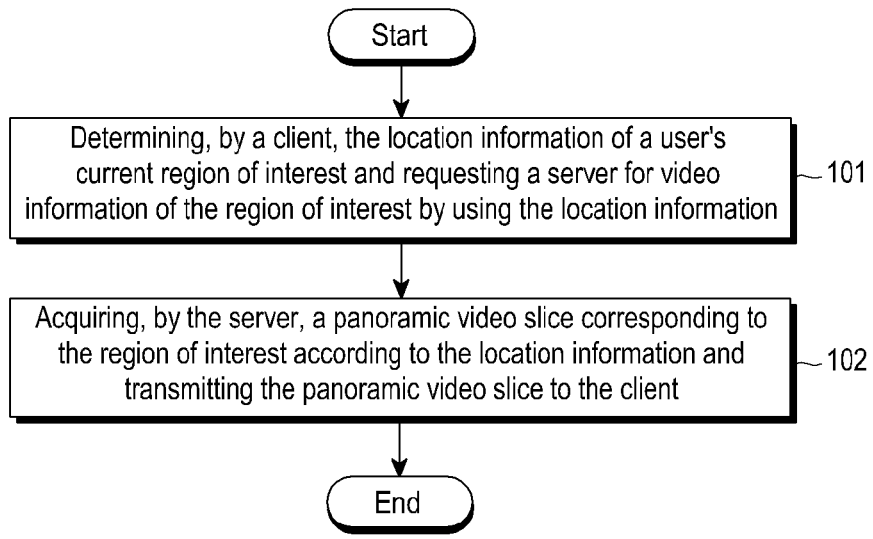
[Fig. 2]
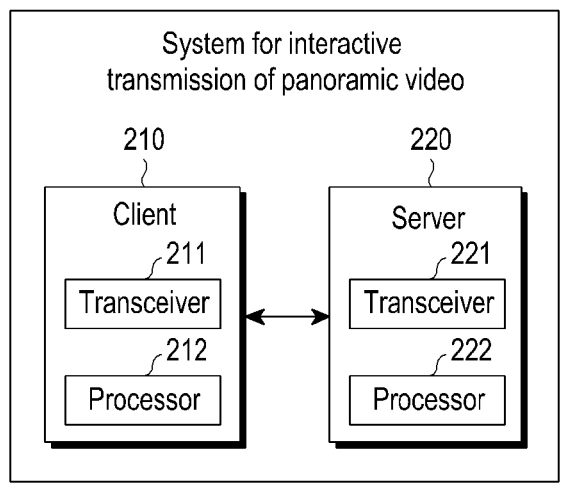

METHOD AND SYSTEM FOR INTERACTIVE TRANSMISSION OF PANORAMIC VIDEO

PRIORITY

This application is a National Phase Entry of International Application No. PCT/KR2017/007483, which was filed on Jul. 12, 2017, and claims priority to Chinese Patent Application No. 201610547764.1, which was filed on Jul. 12, 2016, the content of each of which are incorporated herein by reference.

TECHNICAL FIELD

The present invention relates to the technical field of panoramic video, and more particularly to a method and system for interactive transmission of panoramic video.

BACKGROUND ART

With the rapid development of computer technology, there are more and more types of multimedia contained and more and more effects that can be shown. Some traditional ways of expression are more and more unable to meet requirements on ways of show of a majority of customers.

Panoramic video is a newly emerging media, and compared with traditional video, is characterized by a large field of vision, high resolution, a large amount of data, etc. By using the panoramic video, an observer can observe all of a surrounding scene by changing a direction of observation, leaving a point of view of the observer unchanged. While ordinary two-dimensional video only reflects a part of the panoramic video. Panoramic video is being used more and more in fields such as showing real estate, sightseeing spots, cars, hotels, campuses, culture and sports venues, corporate office environments, etc.

Generation of panoramic video is an image-stitching-oriented technique. First, real-time images of different angles are collected using a number of cameras, wherein the number of cameras required is related to angles of collection. Then, the images of different angles collected at the same time are stitched into a 360-degree panorama by using a seamless image stitching technique. Finally, the panorama is mapped onto a two-dimensional plane with a cylinder or sphere algorithm.

DISCLOSURE OF INVENTION

Technical Problem

Since a panoramic video image is stitched by multiple collected images, the resolution of the panoramic image is very large, and its amount of data is 5 to 6 times or more than that of a normal image. For example, the current virtual reality device of the Facebook company, Oculus Rift VR glasses, can transmit panoramic video of a monocular resolution of 6K and a frame rate of 60 fps. A code rate of the panoramic video may be up to 245 Mbps. Thus, if all data of panoramic video is transmitted to a client in accordance with a traditional video transmission solution, significant transmission resource overhead will be generated. In addition, due to the large amount of data of the panoramic video, a resulting network transmission delay is large, thereby causing a client's choppy playing of the panoramic video.

Solution to Problem

In view of the above, the main object of the present invention is to provide a method and system for interactive transmission of panoramic video, which method can reduce resource overhead and a transmission delay of panoramic video transmission.

To attain the above objective, the present invention provides the following technical solutions.

A method for interactive transmission of panoramic video by a client, the method comprising:
determining the location information of a user's current region of interest, and requesting a server for video information of the user's current region of interest by using the location information; and, receiving, from the server, a panoramic video slice corresponding to the user's current region of interest acquired based on the location information.

A method for interactive transmission of panoramic video by a server, comprising:
receiving, from a client, a video slice request message comprising location information of a user's current region of interest;
acquiring a panoramic video slice corresponding to the user's current region of interest according to the location information; and
transmitting, to the client, the panoramic video slice. A client for interactive transmission of panoramic video, the client comprising:
a processor configured for determining the location information of a user's current region of interest, and requesting a server for video information of the user's current region of interest by using the location information; and
a transceiver configured for receiving, from the server, a panoramic video slice corresponding to the user's current region of interest acquired based on the location information.

A server for interactive transmission of panoramic video, the server comprising:
a transceiver configured to receive, from a client, a video slice request message comprising location information of a user's current region of interest;
a processor configured to acquire a panoramic video slice corresponding to the user's current region of interest according to the location information, and control the transceiver to transmit, to the client, the panoramic video slice.

To sum up, in accordance with the method and system for interactive transmission of panoramic video proposed by the present invention, a client locates a current region of interest of a user and transmits information of the location to a server, and the server only needs to locate a panoramic video slice corresponding to the region of interest of the user and transmit only the panoramic video slice to the client. In this way, an amount of video transmission can be greatly reduced, so that resource overhead and a transmission delay of transmission of panoramic video can be effectively reduced and further fluency of the client's playing the panoramic video can be improved.

BRIEF DESCRIPTION OF DRAWINGS

FIG. 1 is a schematic flow diagram of a method in accordance with an embodiment of the present invention; and FIG. 2 is a schematic diagram illustrating the structure of an apparatus in accordance with an embodiment of the present invention.

BEST MODE FOR CARRYING OUT THE INVENTION

In order to make the objects, technical solutions and advantages of the present invention clearer, the present invention is hereinafter described in detail with reference to the drawings and embodiments.

The core idea of the present invention is that a client calculates and tracks a region of interest of a user and transmits it to a server, and the server transmits only a video slice corresponding to the region of interest of the user to the client. In this way, resource overhead and a delay of transmission of panoramic video can be reduced.

FIG. 1 is a schematic flow diagram of a method for interactive transmission of panoramic video in accordance with an embodiment of the present invention. As shown in FIG. 1, the embodiment mainly includes the following steps.

In step 101, a client determines the location information of a user's current region of interest, and requests a server for video information of the region of interest by using the location information.

In this step, the client needs to determine the location information of the user's current region of interest before requesting the server for video so that the server can transmit only a video slice corresponding to the user's current region of interest to the client based on the location information in a subsequent step.

Taking into account that in a practical application, a human eye's normal viewing angle is in a certain range, such as about 120 degrees, most current virtual reality products have a viewing angle between 110 degrees to 120 degrees, and some products are even lower than the value. Preferably, in order to make an amount of video slice acquired each time exactly match the user's viewable needs, a viewing angle range of the region of interest may be set to a current viewable viewing angle range of the user, such as 120 degrees. So, a region beyond the viewing angle is not regarded as a region of interest of the user due to the limited current viewing angle of the user. The client does not acquire corresponding region information, or request the server for corresponding panoramic video data and transmit it, so that an amount of video transmission is reasonably controlled and the problem of transmission delay is effectively resolved, while a viewable need of the user is met.

When the location information of the region of interest is to be determined, the client needs to convert coordinates of a center point of the current region of interest of the user in a camera coordinate system into coordinates in the world coordinate system and inform the server of the converted coordinates as the location information, so that the server can accurately locate a video slice corresponding to the region of interest based on the location information. The specific conversion method is available to those skilled in the art and will not be repeated here.

Preferably, the location information of the region of interest may include: an x coordinate of the center point of the region; a y coordinate of the center point of the region; a length value of the region; and, a width value of the region. In a practical application, the location information is not limited to the above information, but information contained in the location information only needs to satisfy the need for the server to accurately locate the region of interest.

Preferably, the client may request the server for video information of the region of interest in the following manner:

transmitting, by the client, a video slice request message to the server, the video slice request message carrying the location information of the current region of interest.

In a practical application, the location information of the region of interest may be organized using the JSON data format. For example, in a case where the location information of the region of interest is composed of the x coordinate of the center point of the region, the y coordinate of the center point of the region, the length value of the region and the width value of the region, the following data segment can be generated using the JSON data format:

```
{
    ...
    "xcoordinate": 100,
    "ycoordinate": 200,
    "width": 600,
    "height": 300,
    ...
},
``` where xcoordinate represents the x coordinate of the center point of the region of interest, ycoordinate represents the y coordinate, width represents the width of the region, and height represents the height of the region. The above segment of data represents that the x coordinate of the center point of the region of interest is 100, the y coordinate is 200, the width of the region is 600, and the height of the region is 300.

This is only an example of a data format for the location information in a practical application. In a practical application, the present invention is not limited thereto, and those skilled in the art can select an appropriate data organization manner according to actual needs, which will not be repeated here.

In a practical application, this step can be implemented in a periodic trigger mode. That is, the client can periodically request the server for video information of the current region of interest according to a certain period. An appropriate value can be set for a length of the period by those skilled in the art according to requirements on continuity of display of panoramic video and a delay of video transmission.

This step can also be implemented in an event-triggered manner. For example, the client can request the server for video information of the current region of interest when the user has a need of viewing video.

In a practical application, the client may be a terminal device such as a mobile phone and a tablet, or be visual equipment such as a headset virtual reality helmet and eyeglasses, and the server may be implemented by a computer.

In step 102, the server acquires a panoramic video slice corresponding to the region of interest according to the location information, and transmits the panoramic video slice to the client.

In this step, the server sends only the panoramic video slice corresponding to the user's current region of interest to the user. In this way, an amount of video transmission can be greatly reduced, so that resource overhead and a transmission delay of transmission of panoramic video can be effectively reduced and further fluency of the client's playing the panoramic video can be improved.

It is to be noted that, in a practical application, the server saves the panoramic video in a manner of video slices. That is, the panoramic video needs to be spitted first to acquire a number of video slices and then save the acquired video slices. In this way, the server can only read out a video slice related to the region of interest after obtaining the locating information of the region of interest of the user. Splitting and saving of the panoramic video can be implemented using existing methods, which will not be repeated here.

Preferably, in order to reduce a delay of obtaining a panoramic video slice, in this step, the server can reduce a processing delay generated by reading of a storage medium by giving priority to reading the panoramic video slice corresponding to the region of interest from a cache. Specifically, this can be achieved in the following method:

determining, by the server, whether the panoramic video slice corresponding to the location information already exists in a cache of the server; and, if so, reading the panoramic video slice from the cache, and otherwise acquiring the panoramic video slice from an external memory where the panoramic video is.

Preferably, the server may further reduce the delay of obtaining a panoramic video slice by pre-caching a panoramic video slice required by a user. Specifically, this can be achieved in the following method:

estimating, by the client, a region of interest of the user in the next period and transmitting location information of the estimated region of interest to the server in each period for calculating a region of interest; and acquiring, by the server, a panoramic video slice according to the location information of the estimated region of interest and saving the panoramic video slice in a cache.

The each period for calculating a region of interest is used to define a period in which the client updates the location information of a region of interest of the user. A length of the period may be set by those skilled in the art according to actual needs.

In the above pre-caching method, the client needs to estimate a region of interest of the user in the next period. That is, a direction and angle of the next move of the client can be estimated according to a rotational direction, a rotation angle and the displacement acceleration of motion captured by a sensor when the client rotates in the current period, and the region of interest in the next period can be estimated based on the direction and angle. The above motion includes, but is not limited to, operations such as turning left, turning right, turning up, turning down, zooming in, and zooming out. A specific estimation method is available to those skilled in the art and will not be repeated here.

In a practical application, the client may transmit the location information of the estimated region of interest for the next period in the current period to the server by using the request when making a request for video information of the region of interest to the server.

In order to reduce the processing delay of the server, the server may be specifically implemented to perform operations of reading of a video slice for the current period and pre-reading of a video slice for the next period with different threads, so that the number of times a same thread sequentially reads the storage media can be reduced and thereby a system response time can be reduced. Specifically, a current period video slice reading thread of the server reads the video slice corresponding to the user's region of interest in the current period, while a pre-reading thread reads a video slice corresponding to the region and buffers it in a memory after the location information of a region of interest of the user in the next period is obtained in the current period.

Preferably, after the client receives video clip data returned by the server in step 102, in order to prevent choppy video due to insufficient video slice data during rendering of panoramic video, a received video slice may be buffered locally first and then is rendered and displayed.

From the above embodiments of the interactive method for panoramic video, it can be seen that the present invention can effectively reduce a bandwidth required for transmission of the panoramic video and reduce a delay of the transmission of the panoramic video, thereby effectively improving the user's experience. FIG. 2 shows a system for interactive transmission of panoramic video corresponding to the above method. As shown in FIG. 2, the system comprises:

a client for determining the location information of a user's current region of interest and requesting a server for video information of the region of interest by using the location information; and the server for acquiring a panoramic video slice corresponding to the region of interest according to the location information and transmitting the panoramic video slice to the client.

Preferably, the client is used to transmit a video slice request message to the server, the video slice request message carrying the location information of the current region of interest.

Preferably, the client is further used to estimate a region of interest of the user in the next period and transmit location information of the estimated region of interest to the server in each period for calculating a region of interest, and The server is used to acquire a panoramic video slice according to the location information of the estimated region of interest and save the panoramic video slice in a cache.

Preferably, the server is used to determine whether the panoramic video slice corresponding to the location information already exists in a cache of the server, and, if so, read the panoramic video slice from the cache, and otherwise acquire the panoramic video slice from an external memory where the panoramic video is.

Preferably, the location information comprises: an x coordinate of the center point of the region; a y coordinate of the center point of the region; a length value of the region; and, a width value of the region.

Preferably, a viewing angle range of the region of interest is a current viewable viewing angle range of the user.

FIG. 2 is a schematic diagram illustrating the structure of an apparatus in accordance with an embodiment of the present invention.

As shown in FIG. 2, a client 210 according to the embodiment of the present invention comprises a transceiver 211, and a processor 212. and a server 220 according to the embodiment of the present invention comprises a transceiver 221, and a processor 222.

firstly, the processor 212 of the client 210 is configured for determining the location information of a user's current region of interest, and request the server 220 for video information of the user's current region of interest by using the location information.

the transceiver 211 is configured for receiving, from the server 220, a panoramic video slice corresponding to the user's current region of interest acquired based on the location information.

wherein the requesting the server for the video information of the region of interest comprises that the transceiver 211 transmits, to the server 220, a video slice request message comprising the location information of the current region of interest.

wherein the processor 212 is configured to estimate a region of interest of the user in the next period, and the transceiver 211 is configured to transmit, to the server, location information of the estimated region of interest in each period for calculating the region of interest.

neatly, a transceiver 221 of the server 220 receiv3s, from a client, a video slice request message comprising location information of a user's current region of interest, and the processor 222 is configured to acquire a panoramic video slice corresponding to the user's current region of interest according to the location information, and the transceiver 221 is configured to transmit, to the client, the panoramic video slice.

the transceiver 221 is configured to receive, from the client, location information of a region of interest of the user estimated in a each period, and the transceiver 221 is configured to acquire a panoramic video slice according to the location information of the estimated region, and saving the panoramic video slice in a cache.

wherein the acquiring a panoramic video slice corresponding to the region of interest comprises the processor 222 is configured to determine whether the panoramic video slice corresponding to the location information existed in the cache; and, if so, read the panoramic video slice from the cache, and otherwise acquire the panoramic video slice from an external memory where the panoramic video is.

To sum up, the foregoing is only preferred embodiments of the present invention and is not for use in limiting the protection scope thereof. Any modification, equivalent substitution, and improvement without departing from the spirit and principle of the present invention should be covered in the protection scope of the present invention.

The invention claimed is:

1. A method for interactive transmission of panoramic video by a user equipment (UE), the method comprising:
   defining a period in which the UE updates location information of a region of interest;
   determining current location information of a current region of interest in a current period according to the defined period;
   requesting a server for video information of the current region of interest by using the current location information;
   receiving, from the server, a panoramic video slice corresponding to the current region of interest;
   capturing a rotational direction of the UE, a rotation angle of the UE, and a displacement acceleration of the UE in the current period;
   estimating a next region of interest in a next period according to the defined period based on the rotational direction of the UE, the rotation angle of the UE, and the displacement acceleration of the UE in the current period; and
   transmitting, to the server, next location information of the next region of interest for calculating a next panoramic video slice corresponding to the next region of interest.

2. The method of claim 1, wherein the requesting the server for the video information of the current region of interest comprises:
   transmitting, to the server, a video slice request message comprising the location information of the current region of interest.

3. The method of claim 1, wherein the location information comprises an x coordinate of a center point of the current region of interest, a y coordinate of the center point of the current region of interest, a length value of the current region of interest, and a width value of the current region of interest.

4. The method of claim 1, wherein a viewing angle range of the current region of interest is a current viewable viewing angle range of the UE.

5. A method for interactive transmission of panoramic video by a server, comprising:
   receiving, from a user equipment (UE), a video slice request message comprising current location information of a current region of interest of the UE in a current period according to a defined period in which the UE updates location information of a region of interest, the period is defined by the UE;
   acquiring a panoramic video slice corresponding to the current region of interest according to the location information;
   transmitting, to the UE, the panoramic video slice;
   receiving, from the UE, next location information of a next region of interest in a next period according to the defined period, the next region of interest in the next period is estimated based on a rotational direction of the UE, a rotation angle of the UE, and a displacement acceleration of the UE in the current period; and
   acquiring a next panoramic video slice according to the next location information of the next region of interest, and saving the next panoramic video slice in a cache.

6. The method of claim 5, wherein the acquiring the panoramic video slice corresponding to the current region of interest comprises:
   determining whether the panoramic video slice corresponding to the location information existed in the cache; and, if so, reading the panoramic video slice from the cache, and otherwise acquiring the panoramic video slice from an external memory where the panoramic video is.

7. The method of claim 5, wherein the location information comprises an x coordinate of a center point of the current region of interest, a y coordinate of the center point of the current region of interest, a length value of the current region of interest, and a width value of the current region of interest.

8. The method of claim 5, wherein a viewing angle range of the current region of interest is a current viewable viewing angle range of the UE.

9. A user equipment (UE) for interactive transmission of panoramic video, the UE comprising:
   a transceiver; and
   at least one a-processor coupled to the transceiver,
   wherein the at least one processor is configured for:
      defining a period in which the UE updates location information of a region of interest;
      determining current location information of a current region of interest of the UE in a current period according to the defined period;
      requesting a server for video information of the current region of interest by using the current location information;
      receiving, from the server, a panoramic video slice corresponding to the current region of interest;
      capturing a rotational direction of the UE, a rotation angle of the UE, and a displacement acceleration of the UE in the current time period;
      estimating a next region of interest in a next period according to the defined period based on the rotational direction of the UE, the rotation angle of the UE, and the displacement acceleration of the UE in the current period; and
      transmitting, to the server, next location information of the next region of interest for calculating a next panoramic video slice corresponding to the next region of interest.

10. The UE of claim 9, wherein the at least one processor is further configured for transmitting, to the server, a video slice request message comprising the location information of the current region of interest.

11. A server for interactive transmission of panoramic video, the server comprising:

a transceiver; and
at least one processor coupled to the transceiver,
wherein the at least one processor is configured for:
- receiving, from a user equipment (UE), a video slice request message comprising current location information of a current region of interest of the UE in a current period according to a defined period in which the UE updates location information of a region of interest, the period is defined by the UE;
- acquiring a panoramic video slice corresponding to the current region of interest according to the location information;
- transmitting, to the UE, the panoramic video slice;
- receiving, from the UE, next location information of a next region of interest in a next period according to the defined period, the next region of interest in the next period is estimated based on a rotational direction of the UE, a rotation angle of the UE, and a displacement acceleration of the UE in the current period; and
- acquiring a next panoramic video slice according to the next location information of the next region of interest, and saving the next panoramic video slice in a cache.

12. The UE of claim 9, wherein the location information comprises an x coordinate of a center point of the current region of interest, a y coordinate of the center point of the current region of interest, a length value of the current region of interest, and a width value of the current region of interest.

13. The UE of claim 9, wherein a viewing angle range of the current region of interest is a current viewable viewing angle range of the UE.

14. The server of claim 11, wherein the at least one processor is further configured for:
- determining whether the panoramic video slice corresponding to the location information existed in the cache; and, if so, reading the panoramic video slice from the cache, and otherwise acquiring the panoramic video slice from an external memory where the panoramic video is.

15. The server of claim 11, wherein the location information comprises an x coordinate of a center point of the current region of interest, a y coordinate of the center point of the current region of interest, a length value of the current region of interest, and a width value of the current region of interest.

16. The server of claim 11, wherein a viewing angle range of the current region of interest is a current viewable viewing angle range of the UE.

* * * * *